United States Patent [19]

Blackham et al.

[11] 3,868,333

[45] Feb. 25, 1975

[54] TECHNETIUM CATALYST FOR HYDROCARBON REFORMING

[75] Inventors: Angus U. Blackham; James L. Palmer, both of Provo, Utah

[73] Assignee: The United States of America as represented by the United States Atomic Energy Commission, Washington, D.C.

[22] Filed: Nov. 20, 1973

[21] Appl. No.: 417,651

Related U.S. Application Data

[62] Division of Ser. No. 123,447, March 11, 1971.

[52] U.S. Cl................................. 252/463, 252/461
[51] Int. Cl............................................ B01j 11/06
[58] Field of Search ............ 252/463, 461; 208/135, 208/138

[56] References Cited
UNITED STATES PATENTS
3,574,092    4/1971    Mitsche......................... 252/466 PT OTHER PUBLICATIONS
Kubicka, H., Journal of Catalysis, Vol. 12, No. 3, Nov. 1, 1968, pp. 223–237, Periodic Table of the Elements.

*Primary Examiner*—Winston A. Douglas
*Assistant Examiner*—W. J. Shine
*Attorney, Agent, or Firm*—John A. Horan; Arthur A. Churm; James W. Weinberger

[57] ABSTRACT

This invention relates to a novel technetium catalyst, methods of manufacture thereof and its use in hydrocarbon reforming reactions.

5 Claims, No Drawings

3,868,333

TECHNETIUM CATALYST FOR HYDROCARBON REFORMING

This is a division of application Ser. No. 123,447, filed Mar. 11, 1971.

CONTRACTUAL ORIGIN OF THE INVENTION

The invention described herein was made in the course of, or under, a contract with the United States Atomic Energy Commission.

BACKGROUND OF THE INVENTION

This invention relates to a new and novel catalyst and to a method of preparing and using the same. More specifically, the invention relates to a technetium catalyst, methods of preparing the catalyst and utilization of the catalyst for the reforming of hydrocarbons.

The term "reforming" refers to treatment of certain gasoline fractions to improve antiknock characteristics. Most gasoline fractions contain naphthenic hydrocarbons (cyclo-alkanes), for example cyclohexane, and paraffinic hydrocarbons (alkanes) which are usually of straight-chain or slightly branched-chain structure as well as some aromatic hydrocarbons. For improvement of antiknock characteristics, it is desirable to increase the amount of aromatic compounds present therein. This can be accomplished by reforming the gasoline fraction by dehydrogenating the naphthenic hydrocarbons to aromatics and dehydrogenating and cyclizing (dehydrocyclizing) the straight-chain paraffinic hydrocarbons to aromatics to give the gasoline fraction the desired antiknock characteristics.

This reforming process is generally accomplished by passing the gasoline fraction over a platinum catalyst under reforming conditions. Although platinum catalysts are effective, they are expensive and are subject to poisoning by organic sulfur compounds which occur in the hydrocarbons. This poisoning reduces the efficiency of the catalysts and prevents the reforming reactions from taking place.

SUMMARY OF THE INVENTION

In accordance with this invention the use of technetium as a catalyst for reforming hydrocarbons gives good results yet provides a catalyst which is not as susceptible to poisoning by the organic sulfur compounds in the hydrocarbons as are other catalysts. In addition, the technetium catalyst will remove organic sulfur compounds from the hydrocarbons by decomposing these compounds so that they may be easily and readily removed from the off-gas stream.

It is therefore one object of this invention to provide a process for reforming hydrocarbons.

It is a further object of this invention to provide a process for the aromatization of alkanes and cyclo-alkanes.

It is another object of this invention to provide a process for the aromatization of alkanes and cyclo-alkanes which is not affected by organic sulfur compounds found with the hydrocarbons.

It is still another object of this invention to provide a process for removing organic sulfur compounds from hydrocarbons.

It is another object of this invention to provide a technetium catalyst.

It is an additional object of this invention to provide a technetium catalyst for reforming hydrocarbons.

Finally, it is the object of this invention to provide a method for making technetium catalysts.

DESCRIPTION OF THE PREFERRED EMBODIMENT

These and other objects may be attained by passing the hydrocarbons to be reformed over a catalyst comprising technetium under hydrocarbon-reforming conditions so that alkanes and cyclo-alkanes contained therein will be reformed into aromatic compounds.

A catalyst which consists essentially of technetium on a support material may be produced by several different methods. One method is to prepare an aqueous solution of ammonium pertechnetate containing about 1-20% technetium to which granular alumina of 100 to 200 mesh is added to form a slurry. The slurry is slowly evaporated to dryness with occasional stirring to impregnate the alumina with the pertechnetate. The dried slurry is then heated in $H_2$ at 400°-500° C. for a period of time sufficient to completely reduce the ammonium pertechnetate, thus forming a catalyst of about 1-20% technetium on the alumina support. In general, a period of from about 1 to 4 hours is sufficient to complete the reduction of the technetium.

Another method of preparing a technetium catalyst is to add ammonium sulfide to a slurry of granular alumina and ammonium pertechnetate to precipitate technetium heptasulfide on the alumina. The alumina is then filtered, washed and partially dried before being heated to 400°-500° C. in $H_2$ for from about 1 to 4 hours to reduce the heptasulfide to form the technetium metal catalyst.

Still another method of preparing the catalyst is to mechanically mix the ammonium pertechnetate as a solid with the granular alumina and reduce the resulting mixture for 12 hours in $H_2$ at 400°-500° C. The mixture is then oxidized in $O_2$ for 12 hours at 400° C. to disperse the technetium over the alumina and then again reduced in $H_2$ at 400°-500° C. for 12 hours, forming the catalyst.

The amount of technetium on the support material may vary from 1 to 20%, although a catalyst containing 5% technetium was found to give good results.

A number of materials were found satisfactory to support the technetium for use as a catalyst. The best hydrocarbon-reforming results were obtained using chromatographic alumina of 100 to 200 mesh. Satisfactory results were also obtained with 40–50 mesh $13x$ molecular sieve and with 40–50 mesh anhydrous alumina, although these support materials seemed to promote more hydrocarbon-cracking activity than did the chromatographic alumina.

The principal catalytic activity of technetium is selective dehydrogenation, cyclization and dehydrosulfurization, although some cracking and isomerization may result under certain conditions. The general result of the activity of the technetium catalyst is the aromatization of alkanes and cyclo-alkanes. More specifically, the principal activity is the dehydrocyclization of n-hexane to benzene, n-heptane to toluene and n-octane to ethyl benzene and o-xylene, in addition to the dehydrogenation of methyl-cyclohexane to toluene and cyclohexane to benzene.

Although the presence of organic sulfur compounds with the hydrocarbons to be reformed affects the rate of the reforming reaction, the compounds do not poison the catalyst completely as they would many other catalysts. In addition, the technetium catalyst is useful in removing these sulfur compounds from hydrocarbons by promoting dehydrosulfurization of organic sulfur components such as methyl mercaptan and thiophene to hydrogen sulfide which is a gas and can be readily scrubbed from the reaction off-gas stream. This reaction may be particularly significant for those hydrocarbons which are to be used as fuels for internal combustion engines by cutting down on $SO_2$ contamination of the atmosphere.

The catalyst may be readily regenerated by passing oxygen therethrough at about 500° C. followed by reduction with hydrogen at the same temperature. Regeneration temperatures should be no higher than about 600° C. to prevent any loss of technetium as volatile technetium oxide. The activity of the regenerated catalyst was found to approach that of the fresh catalyst.

Although $Tc^{99}$ is radioactive, since it is a $\beta$-particle emitter, there is no evidence of any radioactivity being imparted to any liquid products resulting from the reforming of hydrocarbons over the technetium catalyst.

Although parameters of the reforming conditions have not been optimized, satisfactory results have been achieved under atmospheric pressure using hydrogen as a carrier gas for the hydrocarbon. The ratios of carrier gas to hydrocarbon will vary with the hydrocarbon, but at atmospheric pressure with n-heptane, the ratio is about 10 to 1. Contact times of the hydrocarbon with the catalyst could also vary from 0.5 to 3.0 seconds without affecting the results.

Temperatures may range from about 400° to 600° C., although the optimum temperature for the reforming reaction is from about 450° to 525° C. Temperatures above about 600° C. may result in some sintering of the catalyst which results in the hydrocarbon-cracking reaction becoming dominant instead of the preferred reforming activity.

The following examples are given as illustrative of the process of this invention and are not to be taken as limiting the scope or extent of the invention.

EXAMPLE I

A catalyst was prepared by adding 1.69 gms of 60% $NH_4TcO_4$ to 10 ml water and mixing the resulting solution with 9.88 gms of Fisher Absorption Alumina to form a slurry. The slurry was slowly evaporated with occasional stirring to impregnate the alumina with $NH_4TcO_4$. The dried slurry was placed in a reactor tube and reduced in hydrogen at 400°-500° C. for 2 hours. The catalyst was then placed in a reactor tube on a glass wool support and the tube inserted into a micro combustion furnace about 7 inches long. Commercial grade hydrogen was bubbled through a vaporization container of n-heptane at 25°-27° C. and into the reactor tube. The ratio of hydrogen to n-heptane was about 10 to 1. The gaseous products from the reactor passed through a column containing in sequence, cotton, n-decylphthalate on firebrick, and Ascarite, to retain any technetium dust particles and liquid hydrocarbons and to react with hydrogen sulfide. The exit gas passed through a cotton filter which was monitored with a GM survey meter before any sampling. No activity above background was observed at this filter and the gas was vented to the hood. Analysis of reactor products was determined by gas chromatographic analysis.

The results given in Table I below show that a high percentage of aromatization of n-heptane was achieved and the majority of this conversion was to toluene.

TABLE I

| Determination Number | Reaction Conditions Temp. °C. | Contact Time sec. | Weight Percentage Conversion of n-heptane Lower Alkanes | | | | | Benzene | Toluene | Yield Toluene % |
|---|---|---|---|---|---|---|---|---|---|---|
| | | | C1-C3 | C4 | C5 | C6 | C7 | | | |
| 1 | 400 | 3.3 | 0.3 | 0.5 | 0.3 | 0 | 2.7 | 0.3 | 3.5 | 46 |
| 3 | 428 | 1.6 | 0.5 | 0.6 | 0.5 | 0.2 | 2.2 | 0.3 | 8.6 | 66 |
| 5 | 450 | 3.1 | 1.7 | 1.8 | 1.5 | 0.5 | 3.4 | 0.3 | 35.0 | 79 |
| 7 | 452 | 1.0 | 0.6 | 0.6 | 0.5 | 0.2 | 1.4 | 0.2 | 14.3 | 80 |
| 9 | 478 | 1.5 | 1.3 | 1.1 | 0.8 | 0.3 | 1.1 | 0.1 | 43.6 | 90 |
| 11 | 500 | 2.9 | 3.0 | 2.0 | 1.4 | 0.5 | 0.5 | 0.7 | 72.8 | 90 |
| 13 | 501 | 1.0 | 1.3 | 0.9 | 0.7 | 0.3 | 0.1 | 0.1 | 43.5 | 93 |
| 15 | 525 | 2.8 | 5.3 | 2.3 | 2.7 | 0.5 | 0.5 | 1.6 | 76.9 | 85 |
| 17 | 526 | 0.9 | 2.3 | 1.3 | 0.9 | 0.4 | 0.4 | 0.2 | 53.1 | 91 |
| 19 | 550 | 2.7 | 11.8 | 5.3 | 2.4 | 0.5 | 0.5 | 3.2 | 71.3 | 75 |
| 21 | 550 | 0.9 | 4.1 | 2.2 | 1.1 | 0.4 | 0.4 | 1.0 | 55.6 | 86 |
| 23 | 575 | 2.6 | 20.9 | 6.9 | 1.8 | 0.2 | 0.2 | 4.3 | 64.7 | 65 |
| 25 | 576 | 0.9 | 9.6 | 4.4 | 1.8 | 0.4 | 0.3 | 3.7 | 66.7 | 77 |
| 27 | 578 | 0.5 | 7.2 | 3.5 | 1.6 | 0.4 | 0.2 | 2.9 | 60.8 | 79 |

EXAMPLE II

To demonstrate the dehydrogenation of methyl cyclohexane, the experiment described to Example I was run, except that methyl cyclohexane was substituted for n-heptane. All conditions remained the same as the conditions in Example I. The results of this experiment are given in Table II below.

TABLE II

| Determination Number | Temp. °C. | Contact Time sec. | Weight Percentage Conversion of Methyl Cyclohexane to Lower Alkanes | | | | C7 or Benzene | Toluene | Yield of Toluene |
|---|---|---|---|---|---|---|---|---|---|
| | | | C1-C3 | C4 | C5 | C6 | | | |
| 1 | 270 | 6.0 | 0.4 | | | | | 29.4 | 98 |
| 2 | 290 | 4.1 | 0.3 | | | | | 93.7 | 99 |
| 3 | 297 | 4.4 | 0.3 | | | | | 95.0 | 99 |
| 4 | 260 | 4.3 | 0.1 | | | | | >2.7 | 96 |

TABLE II – Continued

| Determination Number | Temp. °C. | Contact Time sec. | Weight Percentage Conversion of Methyl Cyclohexane to Lower Alkanes | | | | C7 or Benzene | Toluene | Yield of Toluene |
|---|---|---|---|---|---|---|---|---|---|
| | | | C1-C3 | C4 | C5 | C6 | | | |
| 5 | 270 | 4.4 | 0.1 | | | | | 10.1 | 99 |
| 6 | 280 | 4.1 | 0.1 | | | | | 25.5 | 99 |
| 7 | 290 | 3.0 | 0.2 | | | | | 80.1 | 99 |
| 11 | 320 | 1.8 | 0.1 | | | | 0.1 | 83.1 | 99 |
| 14 | 336 | 1.2 | 0.1 | | | | 1.1 | 77.7 | 98 |
| 24 | 328 | 3.9 | 0.2 | 0 | 0 | 0 | 0.1 | 33.3 | 99 |
| 27 | 454 | 1.1 | 0.2 | 0 | 0 | 0 | 1.3 | 78.6 | 98 |
| 31 | 550 | 0.9 | 1.0 | 0 | 0 | 0 | 2.4 | 48.4 | 94 |
| 34 | 653 | 0.8 | 3.5 | 0 | 0.5 | 0.2 | 9.0 | 85.6 | 86 |

EXAMPLE III

To show the effect of organic sulfur compounds on a technetium catalyst and to determine the extent of dehydrosulfurization of these compounds, an experiment was run with n-heptane and the same catalyst and conditions described in Example I, except that thiophene in a mole ratio of thiophene to n-heptane of about 1:20 was added to the hydrogen carrier gas. The results are given in Table III below.

TABLE III

| Determination Number | Reaction Conditions Temp. °C. | Contact Time sec. | Weight Percentage of Products | | | | | | | |
|---|---|---|---|---|---|---|---|---|---|---|
| | | | C1-C3 | C4 | $H_2S$ | C5 | C6 | n-Heptane | Thiophene | Toluene |
| 1 | 286 | 4.9 | 9.8 | 1.4 | 4.7 | 0.8 | 1.3 | 82.1 | 0 | 0 |
| 2 | 310 | 4.6 | 18.5 | 10.9 | 3.3 | 0.7 | 1.1 | 65.2 | 0 | 0 |
| 3 | 330 | 4.7 | 0.7 | 0.4 | 3.8 | 0.1 | 0.2 | 94.8 | 0 | 0 |
| 4 | 340 | 4.7 | 0.3 | 0 | 1.8 | 0 | 0 | 94.3 | 3.5 | 0 |
| 5 | 367 | 4.6 | 0.3 | 0 | 2.5 | 0 | 0 | 95.5 | 1.7 | 0 |
| 7 | 403 | 4.6 | 0.5 | 0 | 3.4 | 0 | 0 | 96.1 | trace | 0 |
| 9 | 445 | 4.5 | 0.5 | 0.1 | 3.6 | 0 | 0.2 | 95.4 | trace | 0.2 |
| 10 | 465 | 4.5 | 0.7 | 0.1 | 3.9 | 0 | 0.4 | 94.1 | trace | 0.9 |
| 11 | 483 | 4.5 | 0.8 | 0.2 | 4.1 | 0.2 | 0.8 | 89.1 | trace | 4.8 |
| 12 | 500 | 4.5 | 1.1 | 0.4 | 4.2 | 0.2 | 0.8 | 78.5 | trace | 14.2 |

It can be seen that the thiophene was almost entirely desulfurized and that the dehydrocyclization of the n-heptane was steadily improving as the temperature increased, demonstrating that although the thiophene had some poisoning effect on the technetium catalyst the effect could be offset by increasing reaction temperatures.

As can be seen from the above examples, the technetium catalyst of this invention is effective in hydrocarbon reforming reactions, particularly in the aromatization of the alkanes and cyclo-alkanes. In addition, the catalyst shows good resistivity to poisoning by organic sulfur compounds, as well as demonstrating an ability to catalyze the dehydrosulfurization of organic sulfur compounds.

It will be understood that the invention is not to be limited to the details given herein but that it may be modified within the scope of the appended claims.

The embodiments of the invention in which an exclusive property or privilege is claimed are defined as follows:

1. A process for making a technetium catlyst comprising preparing an aqueous solution of a technetium salt, mixing a substrate material with said solution to form a slurry, adding ammonium sulfide to the slurry whereby technetium heptasulfide is precipitated on the substrate, partially drying said substrate and precipitate and heating said partially dried substrate and precipitate in the presence of hydrogen whereby the technetium heptasulfide is reduced to technetium on said substrate, thereby forming the technetium catalyst.

2. The process of claim 1 wherein the solution contains 1 to 20 weight percent of technetium.

3. The process of claim 2 wherein the solution is prepared from ammonium pertechnetate.

4. The process of claim 3 wherein the substrate material is alumina.

5. The process of claim 4 wherein the aluminum is from 100 to 200 mesh and the partially dried substrate and precipitate is heated to a temperature of 400°–500° C. for 1 to 4 hours to reduce the technetium heptasulfide to technetium, thereby forming the catalyst.

* * * * *